(12) United States Patent
Cheng

(10) Patent No.: US 9,227,537 B2
(45) Date of Patent: Jan. 5, 2016

(54) SEAT BUFFERING DEVICE AND VEHICLE SAFETY SEAT HAVING THE SAME

(71) Applicant: Chin-Ming Cheng, N.T. (HK)

(72) Inventor: Chin-Ming Cheng, N.T. (HK)

(73) Assignee: Wonderland Nurserygoods Company Limited, Kwai Chung, N.T. (HK)

( * ) Notice: Subject to any disclaimer, the term of this patent is extended or adjusted under 35 U.S.C. 154(b) by 0 days.

(21) Appl. No.: 14/495,881

(22) Filed: Sep. 24, 2014

(65) Prior Publication Data

US 2015/0091343 A1   Apr. 2, 2015

Related U.S. Application Data

(60) Provisional application No. 61/883,201, filed on Sep. 27, 2013.

(51) Int. Cl.
*B60N 2/28*   (2006.01)

(52) U.S. Cl.
CPC ............ *B60N 2/2884* (2013.01); *B60N 2/2821* (2013.01); *B60N 2/2824* (2013.01)

(58) Field of Classification Search
CPC ... B60N 2/2884; B60N 2/2821; B60N 2/2824
See application file for complete search history.

(56) References Cited

U.S. PATENT DOCUMENTS

| | | | | |
|---|---|---|---|---|
| 5,443,239 | A * | 8/1995 | Laporte | 248/503.1 |
| 8,366,192 | B2 * | 2/2013 | Clement et al. | 297/253 |
| 2007/0069562 | A1 * | 3/2007 | Van Montfort et al. | 297/253 |
| 2009/0261640 | A1 * | 10/2009 | Christ et al. | 297/253 |
| 2010/0032997 | A1 * | 2/2010 | Gold et al. | 297/217.1 |
| 2011/0233374 | A1 * | 9/2011 | Clement et al. | 248/542 |
| 2013/0307300 | A1 * | 11/2013 | Pos | B60N 2/2812 297/216.12 |

FOREIGN PATENT DOCUMENTS

| | | |
|---|---|---|
| CN | 201941624 U | 8/2011 |
| EP | 0 970 842 A1 | 1/2000 |
| EP | 1997672 A2 * | 12/2008 |
| EP | 1997673 A2 * | 12/2008 |
| EP | 2428394 A1 * | 3/2012 |
| FR | 2 864 482 A1 | 7/2005 |
| FR | 3002886 A1 * | 9/2014 |
| GB | 2 424 921 A | 10/2006 |
| GB | 2516601 A * | 1/2015 |
| JP | 2013023032 A * | 2/2013 |

OTHER PUBLICATIONS

Supplementary European Search Report and Written Opinion for corresponding Application No. 14186551.9 mailed on or about Feb. 10, 2015 (6 pages).*

* cited by examiner

*Primary Examiner* — Rodney Mintz
(74) *Attorney, Agent, or Firm* — Winston Hsu; Scott Margo

(57) ABSTRACT

A seat buffering device and a vehicle safety seat including the seat buffering device are provided. The seat buffering device is disposed on a base of the vehicle safety seat. The seat buffering device includes a reinforcing component and at least one concave structure. The reinforcing component is disposed inside the base, and the reinforcing component has a plurality of lateral surfaces. The at least one concave structure is formed on one of the plurality of lateral surfaces. The reinforcing component is adapted to be bent via the at least one concave structure when the base is impacted, so as to reduce impact force applied to the base. Buffering efficiency of the reinforcing component corresponds to the amount, the arrangement, and the angle of the concave structure. The plurality of concave structures is disposed on the same or different lateral surfaces of the reinforcing component in the interlaced arrangement.

11 Claims, 6 Drawing Sheets

SEAT BUFFERING DEVICE AND VEHICLE SAFETY SEAT HAVING THE SAME

CROSS REFERENCE TO RELATED APPLICATIONS

This application claims the benefit of U.S. provisional application No. 61/883,201, filed on Sep. 27, 2013. The entire contents of these related applications are incorporated herein by reference.

BACKGROUND OF THE INVENTION

1. Field of the Invention

The present invention relates to a seat buffering device, and more particularly, to a seat buffering device capable of effectively absorbing impact energy and a vehicle safety seat having the foresaid seat buffering device.

2. Description of the Prior Art

A child safety seat is installed on the vehicle seat and applied to provide safety protection for the passenger. A style of the child safety seat may be varied according to a size of the passenger (such as the baby or the child). The conventional child safety seat utilizes the housing to cover the passenger for avoidance of direct impact, and further utilizes the safety belt to constrain a movement of the passenger so as to prevent the passenger from sliding out of the child safety seat. However, the conventional child safety seat cannot prohibit the external impact from indirect transmission toward the passenger due to lack of shock absorbing function, so that the passenger (the baby or the child) may probably be hurt since the vehicle is impacted and impact energy is transmitted to the passenger via the housing. Therefore, design of a safety seat capable of effectively reducing the impact energy from direct/indirect transmission is an important issue of the related safety seat industry.

SUMMARY OF THE INVENTION

The present invention provides a seat buffering device capable of effectively absorbing impact energy and a vehicle safety seat having the foresaid seat buffering device for solving above drawbacks.

According to the claimed invention, a seat buffering device is disposed on a base of a vehicle safety seat. The seat buffering device includes a reinforcing component and at least one concave structure. The reinforcing component is disposed inside the base, and the reinforcing component has a plurality of lateral surfaces. The at least one concave structure is formed on one of the plurality of lateral surfaces. The reinforcing component is adapted to be bent via the at least one concave structure when the base is impacted, so as to reduce impact energy applied to the base.

According to the claimed invention, the seat buffering device further includes a plurality of reinforcing components and a bridging component. Two ends of the bridging component are respectively connected to the plurality of reinforcing components. The concave structure includes a first contacting surface and a second contacting surface. The first contacting surface is adapted to contact against the second contacting surface when the reinforcing component is bent, so as to constrain bending deformation of the reinforcing component. The concave structure is a V-shaped slot.

According to the claimed invention, the seat buffering device further includes a plurality of concave structures respectively disposed on different positions on one of the plurality of lateral surfaces of the reinforcing component. The seat buffering device further includes another concave structure disposed on another lateral surface of the plurality of lateral surfaces of the reinforcing component. A plurality of sections is distributed over the reinforcing component along a longitudinal direction of the reinforcing component, and the concave structures disposed on different lateral surfaces are respectively formed on different sections of the reinforcing component in an interlaced arrangement.

According to the claimed invention, a vehicle safety seat includes a seat body, a base and a seat buffering device. The seat body is disposed on the base. The seat buffering device includes a reinforcing component and at least one concave structure. The reinforcing component is disposed inside the base, and the reinforcing component has a plurality of lateral surfaces. The at least one concave structure is formed on one of the plurality of lateral surfaces. The reinforcing component is adapted to be bent via the at least one concave structure when the base is impacted, so as to reduce impact energy applied to the base.

According to the claimed invention, the vehicle safety seat further includes a supporting leg disposed on a bottom of the seat buffering device to provide an upward supporting force to the vehicle safety seat.

The seat buffering device of the present invention disposes the reinforcing component with the concave structures inside the base, and the reinforcing component can be bent via the concave structure since the seat is impacted to absorb the impact energy applied to the base. Buffering efficiency of the reinforcing component corresponds to the amount, the arrangement, and the angle between the contacting surfaces of the concave structure. The plurality of concave structures is preferably disposed on the same lateral surface, the adjacent lateral surfaces and/or the opposite lateral surfaces of the reinforcing component in the interlaced arrangement for absorption of the impact force with different orientation. Comparing to the prior art, the seat buffering device of the present invention has advantages of simple assembly and low manufacturing cost, and the vehicle safety seat can effectively absorb and reduce the external impact energy by the seat buffering device to protect safety of the passenger.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
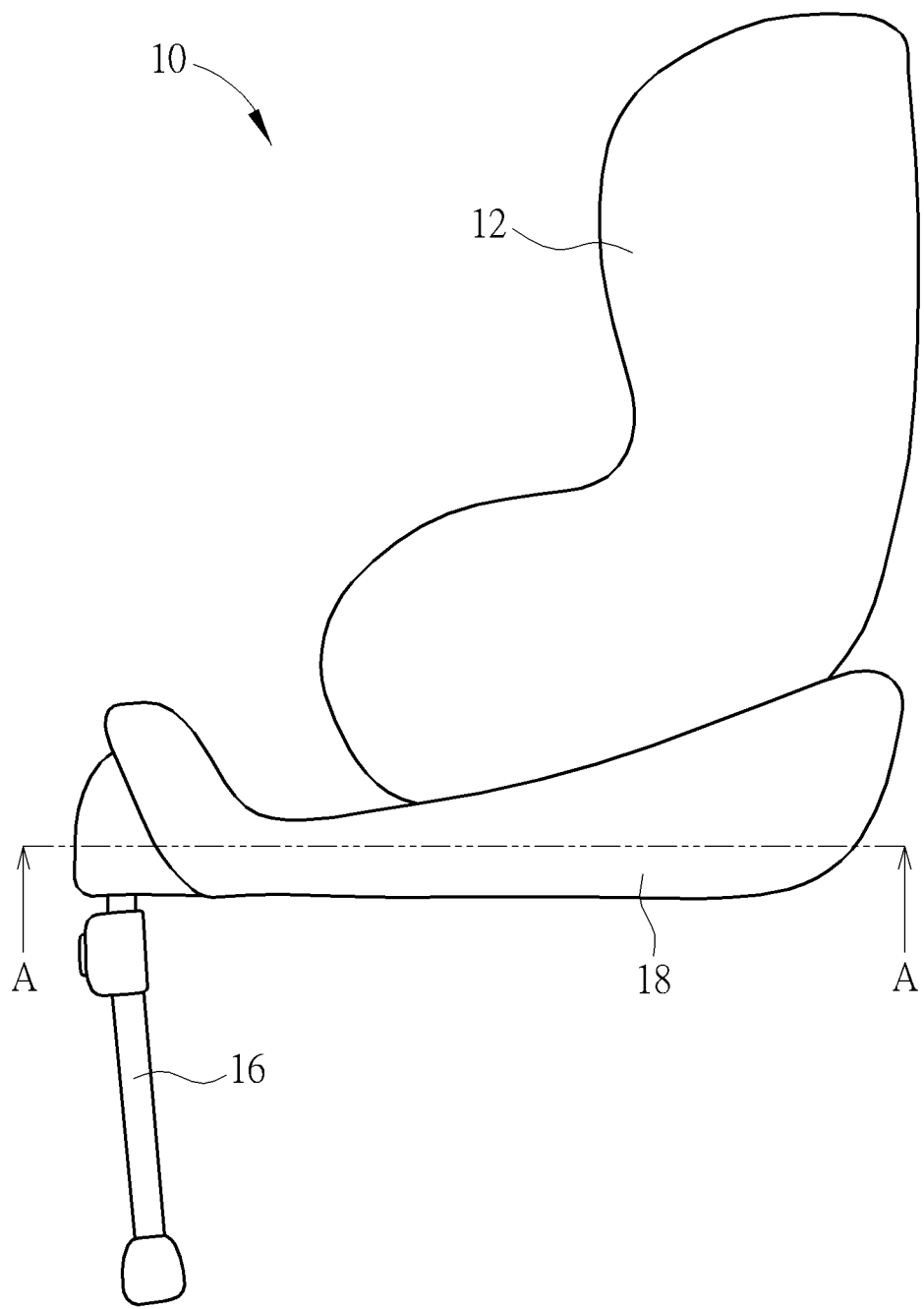
FIG. 1 is a lateral view of a vehicle safety seat according to an embodiment of the present invention.
Figure 2:
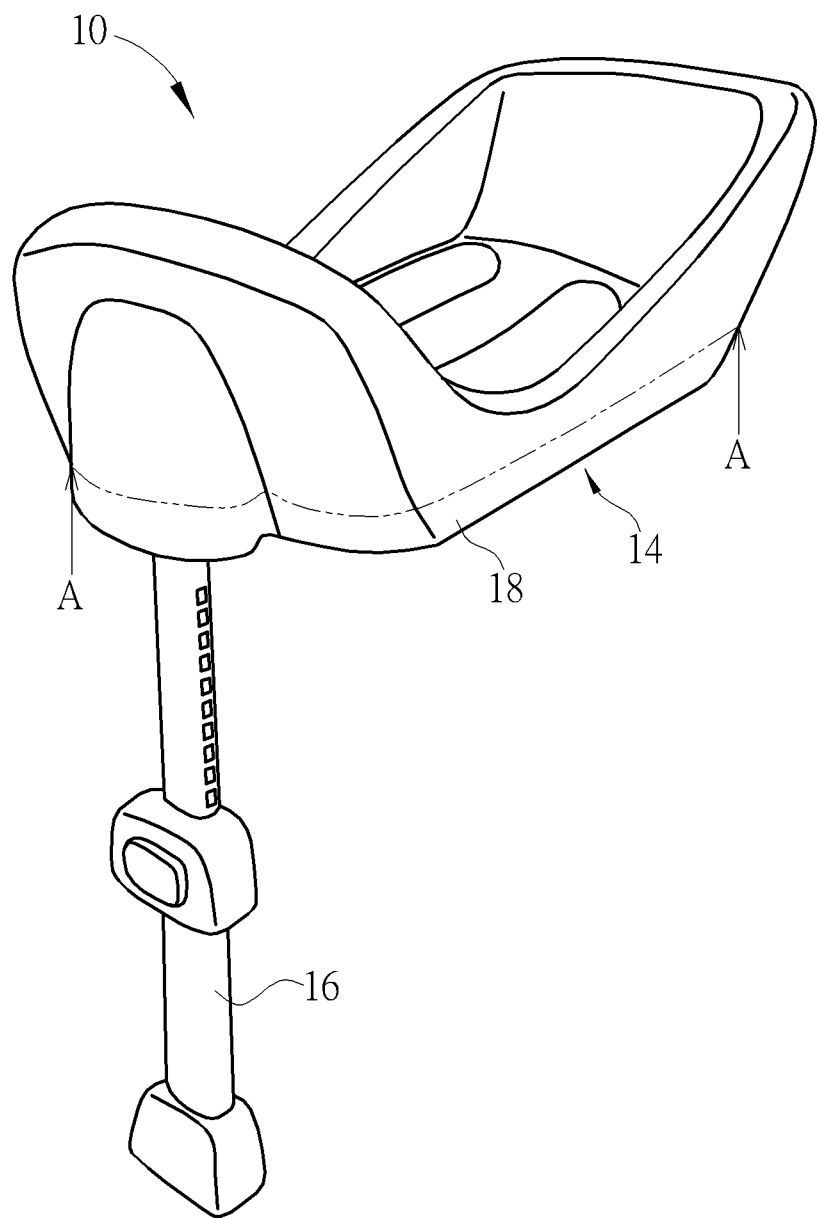
FIG. 2 is a diagram of the vehicle safety seat without a seat body according to the embodiment of the present invention.

Please refer to FIG. 1 and FIG. 2. FIG. 1 is a lateral view of a vehicle safety seat 10 according to an embodiment of the present invention. FIG. 2 is a diagram of the vehicle safety seat 10 without a seat body 12 according to the embodiment of the present invention. The vehicle safety seat 10 includes the seat body 12, a base 18, a seat buffering device 14 and a supporting leg 16. The seat body 12 is detachably disposed on the base 18. The vehicle safety seat 10 is installed inside a vehicle for protection of the baby or the child. The seat body 12 may be disposed in a forward direction of the vehicle and is suitable for the child with larger body. The seat body 12 may be disposed in a backward direction of the vehicle and is suitable for the baby with smaller body. The supporting leg 16 is an optional unit disposed on a bottom of the base 18. An end of the supporting leg 16 is connected to the base 18, and the other end of the supporting leg 16 is disposed against a floor of the vehicle. The supporting leg 16 can provide an upward supporting force to the base 18 to prevent the seat body 12 from toppling or overturning.

Figure 3:
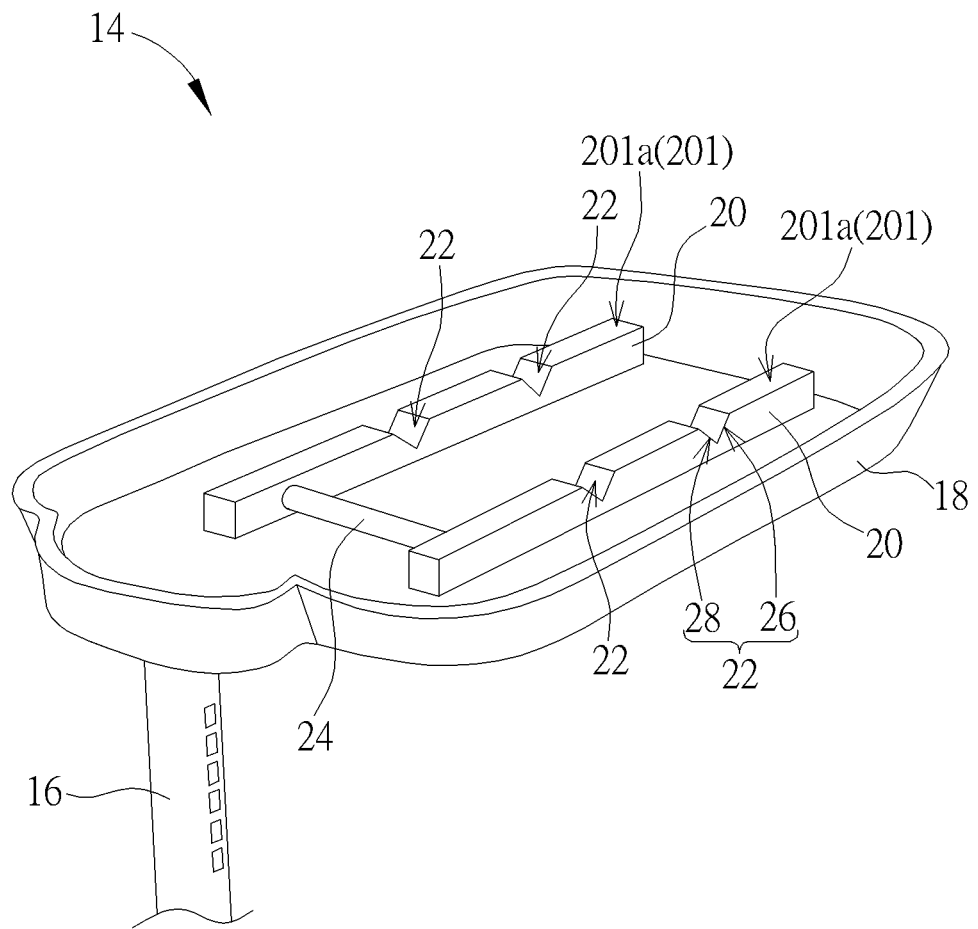
FIG. 3 is a diagram of a seat buffering device according to the embodiment of the present invention.

Please refer to FIG. 3. FIG. 3 is a diagram of the seat buffering device 14 according to the embodiment of the present invention. FIG. 3 illustrates an inner structure of the vehicle safety seat 10 along a section line A-A shown in FIG. 1. The seat buffering device 14 includes a reinforcing component 20 and a concave structure 22. At least one concave structure 22 is disposed on the reinforcing component 20. The reinforcing component 20 is disposed inside the base 18 to strengthen entire structural strength of the base 18. The reinforcing component 20 can be a long-striped rod, and a structural length and radial dimensions of the long-striped rod are designed according to a size of the base 18. The reinforcing component 20 preferably can be a polygon rod with a plurality of lateral surfaces 201. Further, the reinforcing component 20 can be a circular rod.

An amount of the reinforcing component 20 can be one or more. A plurality of reinforcing components 20 can be disposed on the base 18 in a parallel arrangement. The amount and the arrangement of the reinforcing component 20 depend on actual demand, and a detailed description is omitted herein for simplicity. Since the plurality of reinforcing components 20 is disposed inside the base 18, the seat buffering device 14 further includes a bridging component 24, and two ends of the bridging component 23 are respectively connected to the corresponding reinforcing components 20 to strengthen entire assembly strength of the reinforcing components 20. The bridging component 24 is an optional unit, and an amount and arrangement of the bridging component 24 depend on the actual demand. For example, the single bridging component 24 can be disposed between the two reinforcing components 20 to form an H-shaped structure; further, the plurality of bridging components 24 can be disposed between the two reinforcing components 20 in the parallel arrangement to form a lattice structure.

Figure 4:
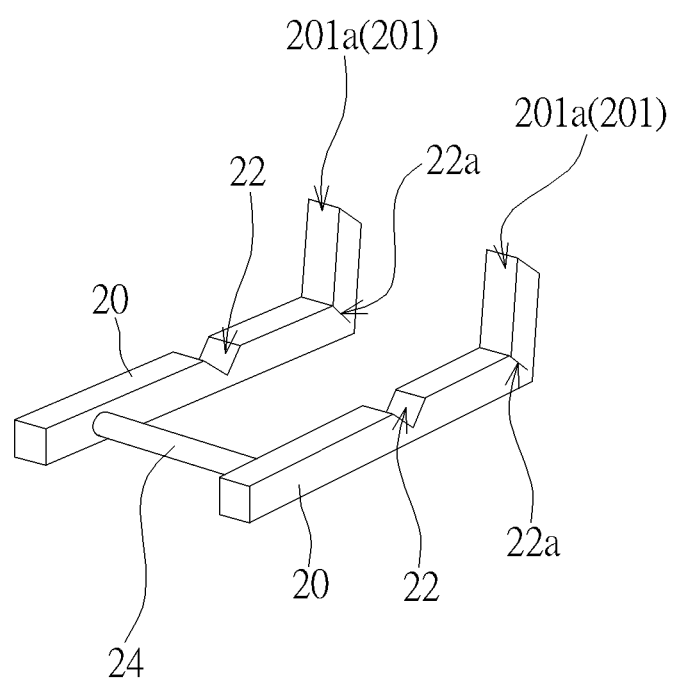
FIG. 4 is a diagram of a deformed reinforcing component according to the embodiment of the present invention.

Please refer to FIG. 3 and FIG. 4. FIG. 4 is a diagram of the deformed reinforcing component 20 according to the embodiment of the present invention. The concave structure 22 is formed on one of the lateral surfaces 201 (such as an upper lateral surface 201a) of the reinforcing component 20. An amount of the concave structure 22 may be one or more, and a plurality of concave structures 22 is dispersed on different positions of the upper lateral surface 201a. The concave structure 22 can include a first contacting surface 26 and a second contacting surface 28. When the vehicle safety seat 10 is impacted, impact energy is mostly transmitted to the reinforcing component 20, and the reinforcing component 20 can be bent via the concave structure 22 to absorb the impact energy, so as to reduce the impact energy and prevent the impact energy from indirectly transmitting to the base 18, so that the passenger sitting on the seat body 12 may have comfortable feel. Since the reinforcing component 20 is bent by an external force (the impact energy), the first contacting surface 26 can contact against the second contacting surface 28 according to structural deformation of the reinforcing component 20, such as the damaged concave structure 22a shown in FIG. 4, and the reinforcing component 20 cannot be bent anymore because of contact between the first contacting surface 26 and the second contacting surface 28.

The reinforcing component 20 of the seat buffering device 14 can be bent through the concave structure 22 (which means junction of the first contacting surface 26 and the second contacting surface 28) to absorb the impact energy accordingly, and the concave structure 22 utilizes the contact between the first contacting surface 26 and the second contacting surface 28 to constrain bending deformation of the reinforcing component 20, so as to prevent the reinforcing component 20 from overbending and decrease of the structural strength. Therefore, an angle formed between the first contacting surface 26 and the second contacting surface 28 corresponds to the allowable bending deformation of the reinforcing component 20. As the plurality of concave structures 22 is formed on the reinforcing component 20, each of the concave structure 22 may have the angle formed between the contacting surfaces identical with or different from that of other concave structures 22. In this embodiment, the concave structure 22 is a V-shaped slot, which means the first contacting surface 26 and the second contacting surface 28 are flat surface connected with each other. Further, the first contacting surface 26 and the second contacting surface 28 may be concave surfaces or convex surfaces. A bottom side of the first contacting surface 26 can be directly connected to a bottom side of the second contacting surface 28, or the bottom sides of the first contacting surface 26 and the second contacting surface 28 are respectively connected to opposite edges of a lower plane to form a U-shaped slot (i.e., a gap formed therebetween). Besides, the angle formed between the first contacting surface 26 and the second contacting surface 28 preferably may be located between 10~90 degrees.

Figure 5:
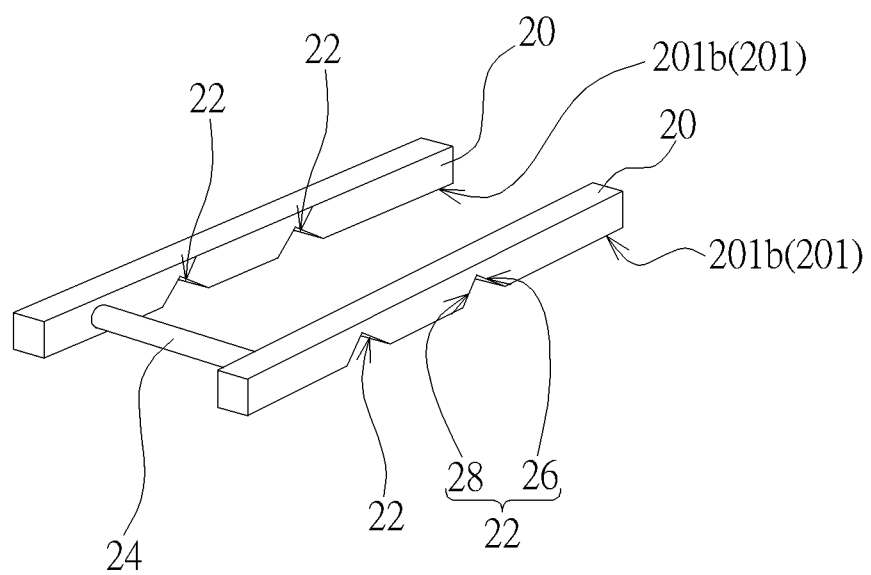
FIG. 5 and FIG. 6 respectively are diagrams of the reinforcing component according to different embodiments of the present invention.
Figure 6:
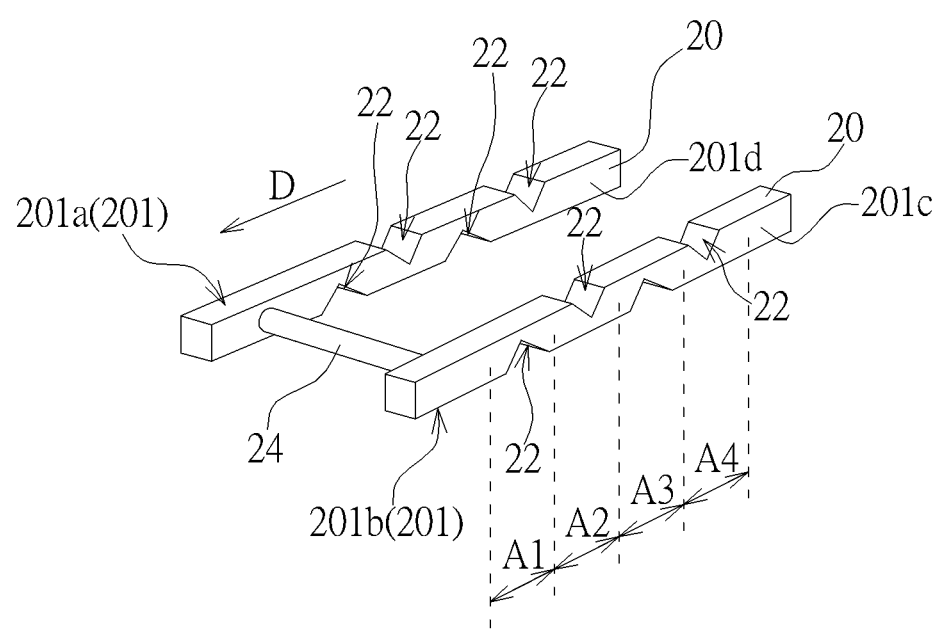

Please refer to FIG. 3 to FIG. 6. FIG. 5 and FIG. 6 respectively are diagrams of the reinforcing component 20 according to different embodiments of the present invention. A plurality of sections, such as the sections A1, A2, A3 and A4, is distributed over the reinforcing component 20 along a longitudinal direction D of the reinforcing component 20. The concave structures 22 of the embodiments shown in FIG. 3 and FIG. 4 are respectively disposed on different positions (different sections) on the upper lateral surface 201a of the reinforcing component 20, to reduce the positive impact force applied on the base 18 of the seat buffering device 14. The concave structures 22 of the embodiment shown in FIG. 5 are respectively disposed on different positions (different sections) on the lower lateral surface 201b of the reinforcing component 20. The reinforcing component 20 can be bent via the concave structure 22 of the lower lateral surface 201b to reduce the impact force applied to the base 18 when the seat buffering device 14 is impacted by a downward impacting force. The concave structures 22 of the embodiment shown in FIG. 6 can be respectively disposed on the upper lateral surface 201a and the lower lateral surface 201b of the reinforcing component 20, or further disposed on an outer lateral surface 201c and/or an inner lateral surface 201d. That is to say, the plurality of concave structures 22 preferably can be disposed on the corresponding sections A1, A2, A3 and A4 of the reinforcing component 20 in the interlaced arrangement to maintain the original structural strength of the reinforcing component 20.

In conclusion, the seat buffering device of the present invention disposes the reinforcing component with the concave structures inside the base, and the reinforcing component can be bent via the concave structure since the seat is impacted to absorb the impact energy applied to the base. Buffering efficiency of the reinforcing component corresponds to the amount, the arrangement, and the angle between the contacting surfaces of the concave structure. The plurality of concave structures is preferably disposed on the same lateral surface, the adjacent lateral surfaces and/or the opposite lateral surfaces of the reinforcing component in the interlaced arrangement for absorption of the impact force with different orientation. Comparing to the prior art, the seat buffering device of the present invention has advantages of simple assembly and low manufacturing cost, and the vehicle safety seat can effectively absorb and reduce the external impact force by the seat buffering device to protect safety of the passenger.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A vehicle safety seat comprising:
    a base; and
    a seat buffering device disposed on the base, the seat buffering device comprising:
        a plurality of reinforcing components disposed inside the base, each of the reinforcing components being disposed in parallel with each other and having a plurality of lateral surfaces;
        a bridging component, two ends of the bridging component being respectively connected in transverse relation to the plurality of reinforcing components;
        at least one concave structure formed on one of the plurality of lateral surfaces for each of the plurality of reinforcing components, each reinforcing component being adapted to be bent via the at least one concave structure when the base is impacted, so as to reduce impact force applied to the base; and
        wherein the concave structure comprises a first contacting surface and a second contacting surface, the first contacting surface contacting against the second contacting surface when the plurality of reinforcing components are bent, so as to constrain bending deformation of the plurality of reinforcing components.

2. The vehicle safety seat of claim 1, wherein the concave structure is a V-shaped slot.

3. The vehicle safety seat of claim 1, further comprising:
    a plurality of concave structures respectively disposed on different positions on one of the plurality of lateral surfaces of the plurality of reinforcing components.

4. The vehicle safety seat of claim 1, wherein the seat buffering device further comprises another concave structure disposed on another lateral surface of the plurality of lateral surfaces of the plurality of reinforcing components.

5. The vehicle safety seat of claim 4, wherein a plurality of sections is distributed over the plurality of reinforcing components along a longitudinal direction of the plurality of reinforcing components, and the concave structures disposed on different lateral surfaces are respectively formed on different sections of the plurality of reinforcing components in an interlaced arrangement.

6. A vehicle safety seat comprising:
    a seat body;
    a base whereon the seat body is disposed; and
    a seat buffering device, comprising:
        a plurality of reinforcing components disposed inside the base, each of the reinforcing components being disposed in parallel with each other and having a plurality of lateral surfaces;
        a bridging component, two ends of the bridging component being respectively connected in transverse relation to the plurality of reinforcing components;
        at least one concave structure formed on one of the plurality of lateral surfaces for each of the plurality of reinforcing components, each reinforcing component being adapted to be bent via the at least one concave structure when the base is impacted, so as to reduce impact force applied to the base; and
        wherein the concave structure comprises a first contacting surface and a second contacting surface, the first contacting surface contacting against the second contacting surface when the plurality of reinforcing components are bent, so as to constrain bending deformation of the plurality of reinforcing components.

7. The vehicle safety seat of claim 6, further comprising:
    a supporting leg disposed on a bottom of the base to provide an upward supporting force to the vehicle safety seat.

8. The vehicle safety seat of claim 6, wherein the concave structure is a V-shaped slot.

9. The vehicle safety seat of claim 6, wherein the seat buffering device further comprises a plurality of concave structures respectively disposed on different positions on one of the plurality of lateral surfaces of the plurality of reinforcing components.

10. The vehicle safety seat of claim 6, wherein the seat buffering device further comprises another concave structure disposed on another lateral surface of the plurality of lateral surfaces of the plurality of reinforcing components.

11. The vehicle safety seat of claim 10, wherein a plurality of sections is distributed over the plurality of reinforcing components along a longitudinal direction of the plurality of reinforcing components, and the concave structures disposed on different lateral surfaces are respectively formed on different sections of the plurality of reinforcing components in an interlaced arrangement.

* * * * *